W. E. WHITE.
LOADING AND CONVEYING MACHINE FOR HARVESTING OPERATIONS.
APPLICATION FILED APR. 12, 1919.

1,359,942.

Patented Nov. 23, 1920.
6 SHEETS—SHEET 1.

William E. White, INVENTOR,

WITNESSES

BY

ATTORNEY

UNITED STATES PATENT OFFICE.

WILLIAM EDWARD WHITE, OF SASKATOON, SASKATCHEWAN, CANADA.

LOADING AND CONVEYING MACHINE FOR HARVESTING OPERATIONS.

1,359,942.     Specification of Letters Patent.     Patented Nov. 23, 1920.

Application filed April 12, 1919.  Serial No. 289,532.

*To all whom it may concern:*

Be it known that I, WILLIAM E. WHITE, a subject of the King of Great Britain, residing at Saskatoon, in the Province of Saskatchewan, Dominion of Canada, have invented a new and useful Loading and Conveying Machine for Harvesting Operations, of which the following is a specification.

This invention has reference to loading and conveying machines for use in harvesting operations, and its object is to provide a machine for displacing men, teams and equipment, incident to threshing operations.

In accordance with the invention, there is provided a body comprising a container and inclosing an elevating conveyer capable of adjustment into different degrees of inclination, whereby the inclination of the conveyer may be increased as the load accumulates to avoid shelling of the grain. The invention provides for pick-up or gatherer mechanism at the load end of the conveyer, by which mechanism the friction incident to its operation is greatly reduced and the power necessary to operate the machine is correspondingly reduced. The invention also contemplates the use of a body as long and wide as the machine with supporting wheels within the confines of the body so that the capacity of the machine is increased over those having exterior wheels and the loader may be housed in a smaller building or space than is required for other loaders of the same capacity. Moreover, it is unnecessary to dismantle the loader in any manner for shipment. The invention also contemplates means for discharging the load and furthermore contemplates many improvements in the construction and arrangements of the parts, whereby lightness and strength of construction is obtained.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

Referring to the drawings, there is shown a body 1 which may be conveniently formed of timbers and slats, and, in the particular structure shown in the drawings, comprises sills 2, longitudinal top timbers 3 of less length than the sills, intermediate longitudinal timbers 4 which may be approximately as long as the sills, uprights or studding 5, 6 and 7 and cross timbers 8, 9 and 10. The several timbers referred to constitute the main frame of the body and container. On opposite sides of the body and secured to the uprights 5, 6 and 7 are strips or slats 11 forming the outer walls of the body as high as the longitudinal beams 4, while above the beams 4 are strips or slats 12 fast to the uprights 5 and occupying the space between the beams 3 and 4. The slats 12 may be spaced farther apart than the strips or slats 11. Braces 13, 14 connect the uprights and serve to stiffen the structure. To further stiffen and strengthen the structure and hold the parts firmly together, rods 15 extend from the top timbers 3 to and through the sills 2. These rods further extend through angle brackets 16 seating and in part embracing the timbers 8 and 9, which brackets are secured to the sills 2 by bolts 17. The body of the loader may, with the exception of the bolts and brackets, be made of wood of relatively light form and is or may be open at the top and ends, while at the bottom a floor 18 is laid upon the cross beams 8 and 9.

That portion of the body of the loader constituting a receptacle or container is mounted upon rear wheels 19, 20, and the forward part of the body is mounted upon front steering wheels 21 of less lateral spread than the rear wheels. These wheels are all inside of the side walls of the body so that the floor space covered by the loader is substantially defined by the outer walls of the container except that timbers 22 are secured lengthwise of the sills on their outer edges for the attachment of tongues 23 (Fig. 4) and in line with the timbers 22. In loaders, as heretofore made, the wheels, and especially the rear wheels, are arranged outside of the margins of the container so that the width of the wheel base is materially increased over that of the loader in this invention. It is because of the contracted wheel base and because of some other features, that the loader may be stored in materially less space than is the case with other loaders. Moreover, the stability of the loader is not reduced since the center of gravity of the loader is low and there is ample spread of the wheels to prevent any top-heaviness.

The floor 18 extends lengthwise of the container between upper side walls 24 constituting the side walls of housings 25 inclosing the rear wheels 19 and 20 and provided with top portions or decks 26 overlying the wheels 19 and 20, whereby the rear wheels are protected from access of bundles of grain delivered into the container. The wheel housing on the side of the container provided with the wheel 20, incloses and protects certain mechanisms.

Figure 5:
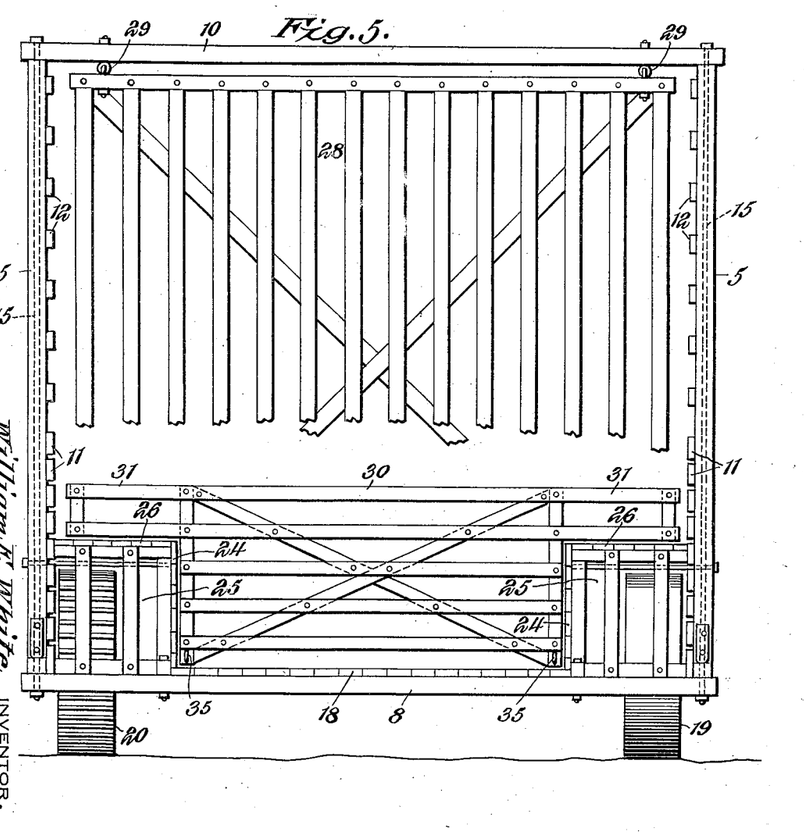
Fig. 5 is a rear elevation with some parts broken away and omitting distant parts.

At the rear the side walls are made longer at the bottom than at the top and the ends of the slats slant and are joined by correspondingly slanting beams or strips 27 joined at the lower end of the rearmost ends of the sills 2 and at the top to the main frame at the rearmost ends of the timbers 3. Pendently hung from the rear top cross timber 10 is a gate 28 of slat construction, this gate being supported by eye bolt hinges 29, being shown in Figs. 3 and 5.

Figure 3:
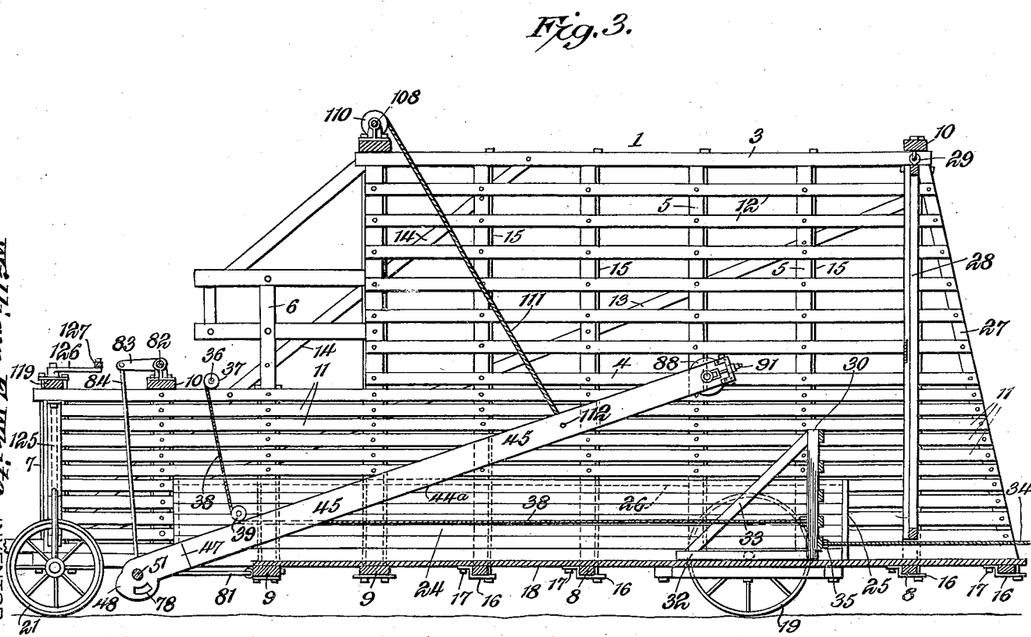
Fig. 3 is a longitudinal vertical section showing the elevating conveyer in a lowered position.

The floor and the side walls 24 of the wheel housings define the channel in which is normally lodged a sweep or pusher structure 30 extending across and higher than the channel. (See Figs. 3 and 5.) The upper portion of the pusher structure has side extensions 31 overriding the decks 26 of the wheel housings. The pusher structure 30 therefore rises to a greater height than the tops of the wheel housings. The pusher structure has a footing extension 32 in the form of a frame, as shown in Fig. 3, and the footing and upright portion of the pusher are connected by brace bars 33, whereby the structure is made rigid and may be moved on the floor 18 of the container lengthwise of said floor, being guided in its movements by the side walls 24 of the wheel housings. In order to move the pusher in a direction to discharge the contents from the container ropes or cables 34 are made fast to eyes 35 at the lower end of upright portions of the pusher and may be continued through the rear end of the container for attachment of power thereto, whereby the contents of the container are discharged through the rear end thereof, the gate 28 giving for the purpose. In order to move the sweep or push 30 toward the front of the container, there is provided a cross shaft 36 with drums or sheaves 37 at the ends. These drums 37 have ropes 38 wound on and secured to them, the ropes passing about guide pulleys 39 at a low point in the container and thence to the sweep or pusher 30 to which they are fastened. The shaft 36 is provided with a sprocket wheel 40 connected by a sprocket chain 41 to another sprocket wheel 42 on a crank shaft 43 having a crank 44 within reach of an operator on the machine, whereby to cause the ropes 38 to wind upon the drums 37 and so retract the pusher or sweep 30 at the will of the operator.

Figures 7, 8:
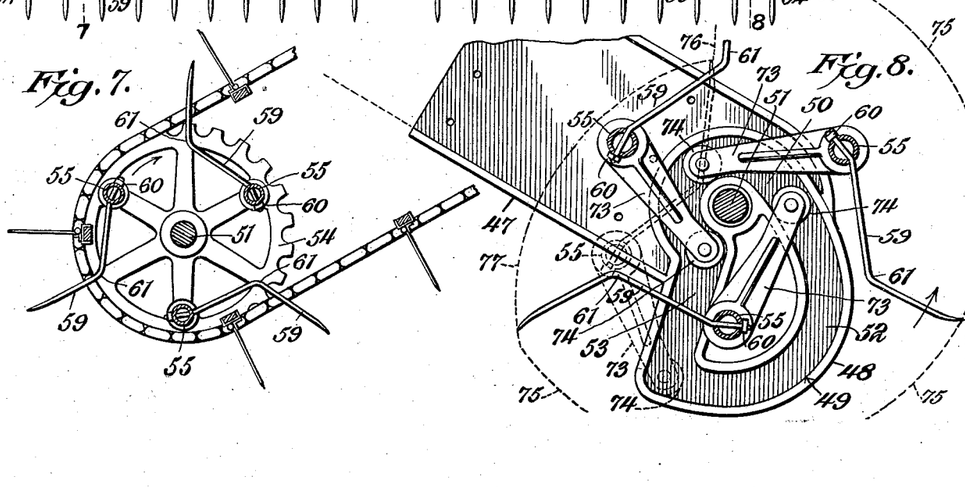
Fig. 7 is a cross section on the line 7—7 of Fig. 6, omitting distant parts.
Fig. 8 is a section on the line 8—8 of Fig. 6, omitting the elevator chain and sprocket.

Within the container and between the front and rear wheels there is mounted a conveyer frame 44ª of a width less than the lateral spacing of the front wheels which may be similar to ordinary elevating conveyers in that it is provided with side plates 45 and cross strips 46 joining them. (See Figs. 3 and 4.) At the forward end of each side plate 45, this being the lower end, a casting 47 is bolted, this casting having an offset end 48 of cam-like construction with a channel 49 on the inner face, that is, the face toward the other side of the conveyer frame. The channel 49, which is best shown in Fig. 8, has a portion 50 of circular outline concentric with a shaft 51, the concentric portion 50 of the channel being of relatively short radius. Merging into one end of the concentric portion 50 of the channel 49 is a portion 52 tangential with the curved portion of the channel and then gradually shortening in radius of curvature, forming a curve of generally parabolic form. Merging into the other end of the curved portion 50 of the channel, which curved portion approximates half a circle, is a substantially radial continuation 53 also joining with the outer end of the curve 52.

Figure 6:
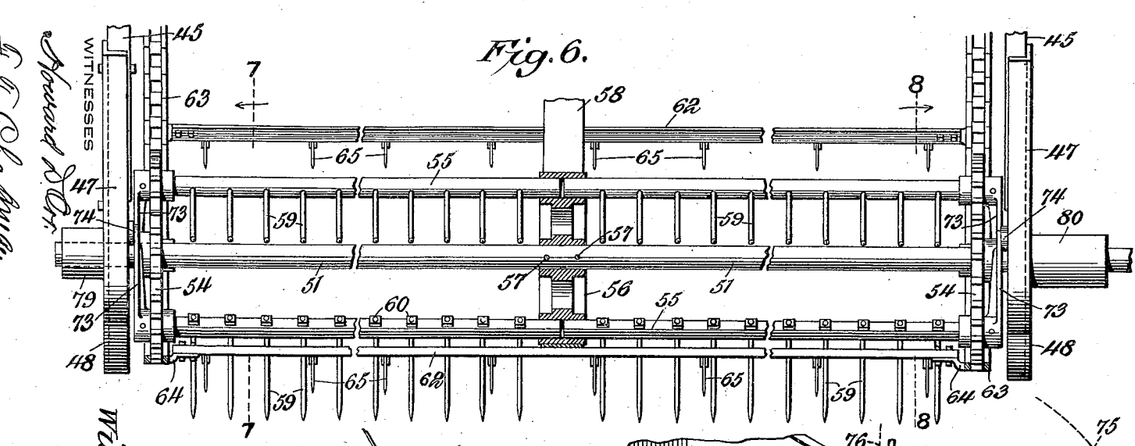
Fig. 6 is a plan view, with some parts in section, of the pick-up mechanism and associated parts.

The shaft 51 adjacent either plate 48 carries a sprocket wheel 54 fast thereon (Figs. 6 and 7). The sprocket wheels carry rotatable rods 55, which, for the sake of lightness, may be of tubular form, and each pair of these rods meet or nearly meet intermediate of the width of the machine where they are received in appropriate portions of a pulley 56 to the hub of which the shaft 51 may be secured by pins 57 or in other appropriate manner. The peripheral portion of the pulley 56 is made sufficiently broad to receive a belt 58 constituting an intermediate member of the conveyer.

The rods 55 each carry a series of pins or teeth 59 and each constitutes a gatherer rake. These pins traverse the rods 55 and are secured in place by any desirable means as by nuts 60. Each pin has its outer end portion bent at an angle to the inner portion, as shown at 61, so that when the sprocket wheels 54 are rotating in a clockwise direction as viewed in Fig. 7, the teeth 59 will engage bundles of grain on the ground and move them forwardly and upwardly to deposit them on the conveyer where they are caught by flights 62 fast to sprocket chains 63 at the ends and to the belt 58 intermediately of the ends.

Figure 9:
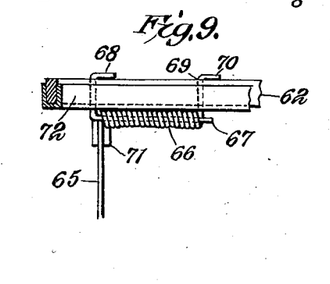
Fig. 9 is a detail view of the spring end of one of the spring teeth and mounting therefor.

The pulley 56 is of less diameter than the sprocket wheels and in order to compensate for this difference, offset connectors 64, best shown in Fig. 6, connect the flights to appropriate ones of the links of the chains 63. Each flight 62 carries a series of fingers 65, these fingers each having a spring mounting shown in detail in Fig. 9. Each finger 65 at the inner end is formed into an elongated coiled spring 66 at right angles to the length of the finger. Through this spring is passed a pin 67 suitably bent at one end and traversing the flight 62 and then turned over, as shown at 68, to anchor the pin to the flight. That end of the spring 66 remote from the bent over end of the pin 67 has a continuation 69 traversing the flight 62 and bent over, as shown at 70, to anchor the spring to the flight. A stop bracket 71 fast on the flight 62 holds the flight finger in a position substantially perpendicular to the flight; but the finger may readily yield in a direction away from the stop 71, if it meets an obstruction, thus avoiding any harm to the elevator. The working surface of each flight is provided with a metallic cover 72, protecting the flight, which is usually of wood, from injury and wear.

As best shown in Figs. 6 and 8, each divided rod 55 carries at each end a rock arm 73 made fast thereto and at the end remote from the rod 55 being provided with a roller 74 lodged in and adapted to travel along the guide groove or channel 49. The result is that as the skeleton pick-up structure is rotated in the direction of the arrow shown in Fig. 8, the ends of the teeth 59 travel along a course shown by dotted lines in Fig. 8. If a roller 74 be entering the groove section 50 the outer or pointed end of the tooth 59 carried by the rock arm 73 on which the roller under consideration is mounted will describe a circle of considerable dimensions, which circle is designated by the dotted line 75 in Fig. 8. Such course of movement of the pointed end of the finger continues so long as the roller 74 of the rock arm 73 is in the circular portion 50 of the groove, which circular portion is of relatively small diameter. As soon as the straight portion 53 of the groove is reached the pointed end of the finger is moved in a path which may be nearly or quite diametric to the axis of rotation of the shaft 51, this path being indicated in part by the dotted line 76 in Fig. 8. As soon as the roller 74 reaches the outer end of the groove or channel section 53 the course changes and follows a path indicated by the dotted line 77 in Fig. 8, until the roller 74 reaches the channel section 50.

The course of travel of the fingers represented by the dotted line 77 is taken during an inactive period of said fingers and consequently the particular shape of groove section 52 is not of moment. The course of travel of the fingers represented by the dotted line 75 is the gathering course and because of the small radius of the channel section 50 the outer ends of the fingers 59 travel rapidly, since they then pass through the greatest distance in a given time of any part of their travel. As soon as the gathering fingers reach their highest point they rapidly descend through a nearly upright path, thereby withdrawing the fingers from the bundles of grain with no material friction or resistance and these bundles are caught by the elevating fingers 65 to be propelled along the elevator toward the discharge end thereof.

In the outer face of each guide plate 48 there is formed an opening 78 whereby lubricant may be applied to the rollers 74, so that friction may be kept down to a minimum.

The shaft 51 extends through boxings 79 and 80 at opposite ends and these boxings are connected by distance links 81 to one of the cross timbers 9 connecting the sills 2. A rock shaft 82 is mounted on the main frame of the container at a height to be accessible to an operator and this shaft carries rock arms 83 connected by drop links 84 to the boxings 79 and 80. A latch lever 85 fast to the shaft 82 permits the rocking of the shaft while a ratchet segment 86 in the path of the latch of the lever 85 provides for holding the lower or gathering end of the picker at any adjusted height to which it may be set.

The lower end of the elevator is raised during transportation and lowered for gathering purposes. The other or higher end of the elevator carries an idler shaft 87 with guide wheels 88 near the ends for the sprocket chains 63 and an intermediate pulley 89 for the belt 58. The elevator frame is shown as provided with a flooring 90 over which the elevator flights may travel, thus supporting them from sagging during the upward movement. A belt tightener structure 91 is effective to the shaft 87 to take up undue slack in the runs of the elevator.

Figure 1:
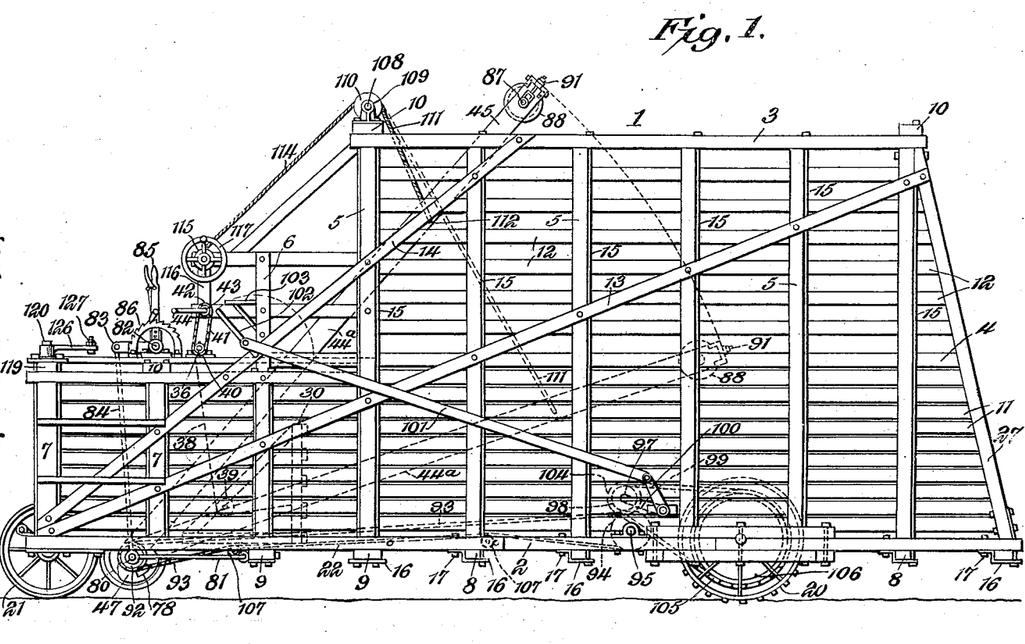
Figure 1 is a side elevation of the loader.
Figure 2:
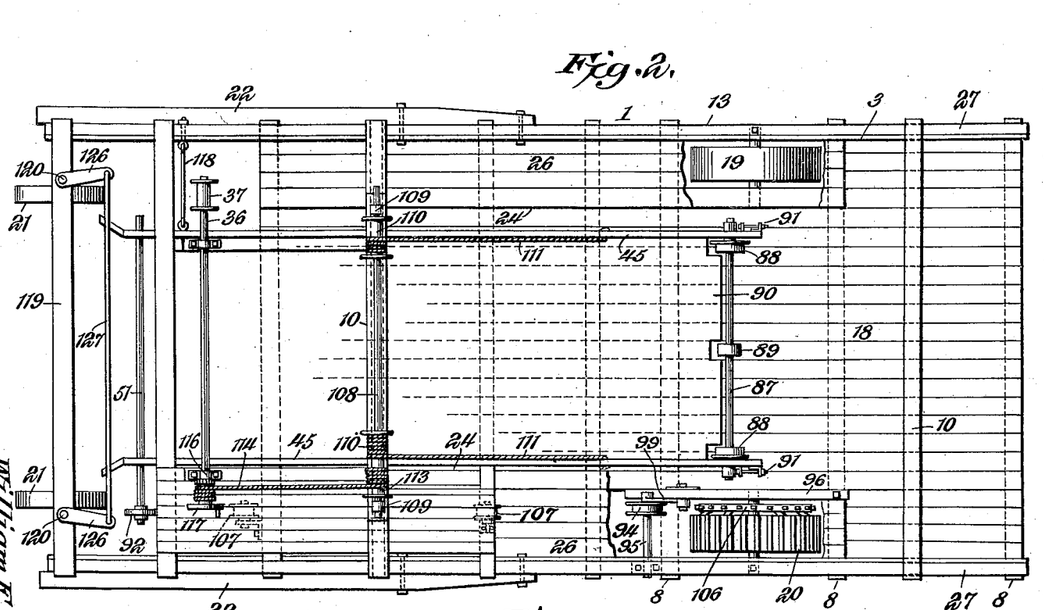
Fig. 2 is a plan view of the loader omitting the elevating conveyer and the unloading structure.

The shaft 51 is continued through and beyond the bearing 80 and there has a driving pulley 92 from which extends a driving belt 93 to another pulley 94 on a countershaft 95 adjacent to the rear driving wheel 20 of the loader (see Figs. 1 and 2). The counter shaft 95 has bearings upon the sill 2 on the corresponding side of the main frame and upon a timber 96 within the boxing for the wheel 20. A rockably mounted shaft 97 carries a friction wheel 98, the mounting of the shaft 97 being by rock arms 99 in turn actuated by a rock arm 100 fast to the arms 99. A link 101 connects the outer end of the arm 100 with a lever 102 mounted on the frame of the machine within ready reach of the operator of the machine, said machine being provided with a seat 103 for the operator adjacent to the two parts controlled by the operator.

The shaft 97 also carries a sprocket pinion 104 connected by a sprocket chain 105 to a sprocket wheel 106 fast to the main driving or power wheel 20. When the machine is traveling along the ground the turning of the main drive wheel 20 causes the rotation of the sprocket pinion 104 through its connection by the sprocket chain 105 with the sprocket wheel 106.

When the machine is traveling over the ground the sprocket pinion 104 constantly rotates but the shaft 97 carrying this pinion may be moved so as to be out of driving relation to the shaft 95. When the friction wheel 98 is moved by a suitable manipulation of the lever 102 into driving relation to the shaft 95 the pulley 94 will cause the driving shaft of the elevator to rotate by means of the driving belt 93 whether the latter be an ordinary belt, a cable, or a sprocket chain. Sagging of the driving belt 93 is avoided by sustaining pulleys or rollers 107 disposed at appropriate points in its course of travel and mounted on suitable ones of the cross beams 8 and 9.

When the loader is traveling over the ground to gather material, such as sheaves of grain for threshing, the elevator is, at the beginning, lowered to the lowest limit of its travel so that grain discharged from its upper end will have but a very short distance to fall. To permit such lowering of the elevator the sweep or pusher is initially placed near the rear of the container and may be advanced toward the front of the container as the elevator is raised and the gathered load becomes larger.

Figure 4:
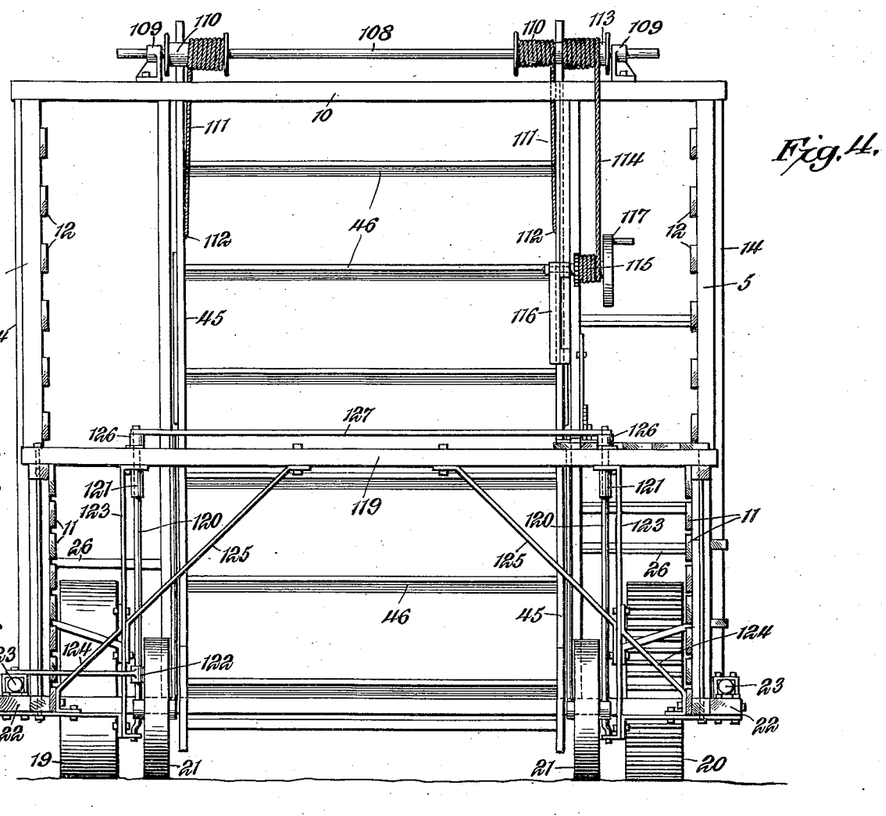
Fig. 4 is a front elevation omitting some distant parts.

To lift the elevator there is provided a shaft 108 mounted in bearings 109 on the forward top cross beam 10 of the higher portion of the container (see Figs. 1, 3 and 4). This shaft carries two drums 110 each receiving one end of a rope or cable 111, the other end of which is made fast to an appropriate portion of the side of the conveyer frame, as shown at 112. On the shaft 108 there is secured a winding drum 113 carrying a rope or cable 114 extending to another winding drum 115 carried by a bracket 116 fast to an appropriate portion of the frame within ready reach of the seat 103 for the operator. The drum is actuated by a crank wheel 117. Bracing links 118, (Fig. 2) between the main frame and the lower end of the conveyer frame serve to stiffen the parts without interference with the movements of the conveyer frame.

The main frame carries a cross beam 119 at the front portion and the front or steering wheels 21 are secured upon upright steering shafts 120 having bearings 121 (Fig. 4) carried by the cross beam 119, and also bearings 122 which may extend to the timbers 22 and be braced thereby. Upright and diagonal braces 123, 124 and 125 contribute to the stiffness or rigidity of the front portion of the machine. The upper steering shafts or spindles 120 are each provided with a rock arm 126 fast thereto and these rock arms are connected by a rod or link 127 for simultaneous movement.

While any suitable power, such as draft animals, may be utilized for drawing the loader, this does not preclude the use of a traction engine. When horses are used as draft animals they are hitched to the tongues 23, there being a tongue on each side of the machine. (See Fig. 4.) When the machine is used it is drawn to the part of the field from which it is desired to gather grain but with the elevating conveyer having the pick-up end raised and the discharge end lowered, the driving mechanism for the conveyer out of gear and the pusher or sweep in the rearmost position. When the point of operation is reached the picker is lowered into proper relation to the ground and the conveyer operating means are put into connection so that as the loader is pulled over the ground the picker will gather sheaves from the ground and deliver them to the elevating conveyer which in turn raises the sheaves to the delivery end of the conveyer, which end, at the time, is in its lowered position. The gathered material is deposited in the rear end of the container having but a very small distance to fall and consequently causing the shedding of little or no grain. As the load accumulates the rear end of the elevating conveyer is raised by a suitable manipulation of the drum 115 and the pusher or sweep is drawn toward the front of the container, as permitted by the raising of the elevating conveyer, by operation of the crank 44. The gathering of the grain proceeds with occasional adjustment of the elevating conveyer and withdrawal of the sweep until the container is loaded, in which condition the elevating conveyer is at its highest point and the sweep is withdrawn to the greatest extent. The container may now be moved to a suitable position and the sweep is drawn toward the rear of the container by means of any suitable power applied to the sweep by the rope or cable 34, the gate 28 readily giving to the discharge of the load of the container. The picker-up end of the elevating conveyer is raised and the conveyer is lowered by the operator manipulating the crank wheel 117, the elevating conveyer readily dropping by gravity. With the parts restored to the initial inactive position the loader may be moved to a new gathering position and properly set for a renewal of the loading operation.

The frame work of the body or container constitutes the running gear for the vehicle.

What is claimed is:—

1. In a machine of the class described, a load carrying body or container with upstanding side walls of a length and width corresponding to that of the machine, elevating means mounted on the machine and discharging into the container, and supporting wheels for the entire machine of a lateral spread less than the width of the body.

2. In a machine of the class described, a load carrying body or container having upstanding side walls of a width corresponding to that of the machine, supporting wheels for the body all mounted inside the side walls of the body, and an elevating conveyer having its lower end extending below the bottom of said body and pivotally mounted, the remaining portion of the conveyer extending upwardly at an incline between the side walls of the body and movable up and down and discharging into the body or container.

3. In a machine of the class described, a load carrying body or container having upstanding side walls of a length and width corresponding substantially to that of the machine, rear supporting wheels partly housed within the container, forward steering wheels having a lateral spread less than that of the rear wheels, and elevating means mounted upon the machine and lying partly within the container to discharge therein, said means operating rearwardly of the forward wheels.

4. In loading and containing machines for harvesting operations, a body corresponding in length and width to the like dimensions of the machine and having supporting wheels of less lateral spread than the width of the body, the rear supporting wheels rising above the bottom of and entering the body and provided with housings covering the wheels above the bottom of the body and elevating means inclosed within and discharging into the body.

5. In a machine of the class described, a load carrying body or container having upstanding side walls of a width corresponding to that of the machine, rear supporting wheels partly housed within the body or container, front steering wheels having a lateral spread less than that of the rear wheels, adjustable elevating means mounted upon the machine to discharge into the body or container, and lying in all adjusted positions to the rear of the front steering wheels, and between the side walls of the body or container, said elevating means being driven by one of said rear wheels.

6. In a machine of the character described, a load carrying body or container having upstanding side walls, rear wheels rising into the body, housings provided upon the body for said wheels, and an elevating conveyer mounted upon the machine within the side walls of the body between the housings.

7. In a machine of the character described, a load carrying body or container having upstanding side walls, housings provided upon the body for said wheels, front wheels spaced apart laterally to a less extent than the rear wheels, and an elevating conveyer mounted upon the machine substantially within the side walls of the body between the front and rear wheels.

8. In a machine of the character described, a load carrying body or container having upstanding side walls, rear wheels rising from the body, housings provided upon the body for said wheels, front steering wheels spaced apart laterally to less extent than the rear wheels, and an elevating conveyer having a width less than the spacing of the front wheels and mounted upon the machine substantially within the side walls of the body between the front and rear wheels and between said housings.

9. In a machine of the class described, a load-carrying body or container having upstanding side walls of a length and width corresponding to the machine, an elevating conveyer pivotally mounted upon the machine and closing the forward end of the body when the load has been taken on, and a gate at the rear end of the body and pendently hung from a high point thereof to close said end.

10. In a machine of the class described, a load-carrying body or container, an elevating conveyer pivotally mounted upon the machine and closing the forward end of the body when the load has been taken on, a gate at the rear end of the body and pendently hung from a high point thereof to close said end, the body having upstanding side walls with rearward extensions sloping upwardly to the line of suspension of the gate, whereby the gate hangs with its lower end to the rear of its upper hinged end.

11. In a machine of the character described, a load-carrying body or container, a conveyer pivotally mounted upon the machine and closing the forward end of the body or container when the load has been taken on, a gate at the rear end of the body or container and pendently hung from a high point thereof to close said end, the body or container having upstanding side walls with rearward extensions sloping upwardly to the line of suspension of the gate, whereby the gate hangs with its lower end to the rear of its upper end, the conveyer sloping upwardly and inwardly in all working positions, its inclination being opposite to that of the rear gate.

12. In loading and containing machines for harvesting operations, a body, an elevating conveyer within the confines of the body, and a sweep or pusher extending crosswise of the body and movable longitudinally of the body and situated below the elevating conveyer.

13. In loading and containing machines for harvesting operations, a body, an elevating conveyer within the confines of the body, and a sweep or pusher extending crosswise of the body and movable therealong and situated below the elevating conveyer, said machine having rear supporting wheels rising into the body, housings covering the rear supporting wheels within the body, and the sweep having side portions overriding the housings and an intermediate portion between the housings.

14. In loading and containing machines for harvesting operations, a container having supporting wheels near the rear end rising into the container, housings within the container for the rear wheels, an elevating conveyer within the container and located between the housings, and a sweep also located between the housings and having side extensions overriding the housings and having a range of travel within the container below the conveyer.

15. In loading and containing machines for harvesting operations, a container having supporting wheels near the rear end rising into the container, housings within the container for the rear wheels, an elevating conveyer within the container and located between the housings, and a sweep also located between the housings and having a range of travel within the container below the conveyer.

16. In loading and containing machines for harvesting operations, a container having supporting wheels near the rear end rising into the container, housings within the container for the rear wheels, an elevating conveyer within the container and located between the housings, and a sweep also located between the housings and having side extensions overriding the housings and having a range of travel within the container below the conveyer, said container being provided with a rear pendently hung gate.

17. In loading and containing machines for harvesting operations, a container, means for depositing material into the container, and a sweep movable lengthwise of the container for engaging material therein and discharging it from the rear end of the container.

18. In loading and containing machines for harvesting operations, a container, an elevating conveyer located within the container, and a sweep for discharging material from the container received from the elevating conveyer, said sweep being located beneath the conveyer and movable lengthwise of the container to discharge the material from the rear end of the container.

19. In loading and containing machines for harvesting operations, a container, an elevating conveyer located within the container and movable into different positions of inclination, and a sweep or pusher also within the container and located to the rear of the conveyer, whereby the conveyer may have the rear end raised and the sweep or pusher may be drawn forwardly as the load accumulates.

20. In loading and containing machines for harvesting operations, a container, an elevating conveyer located within the container and movable into different positions of inclination, and a sweep or pusher also within the container and located to the rear of the conveyer, whereby the conveyer may have the rear end raised and the sweep or pusher may be drawn forwardly as the load accumulates, said container having a pendently hung gate at its rear end yieldable to rearward movements of the pusher discharging accumulations of material from the container.

21. In loading and containing machines for harvesting operations, a container, a conveyer within the container for delivering material thereinto, a sweep or pusher also within the container to the rear of the conveyer and movable toward and from said rear end, and means for retracting the sweep or pusher after having been moved to the rear of the container to discharge material therefrom.

22. In loading and containing machines for harvesting operations, a body, an elevating conveyer within the body and mounted to move up and down therein, a gatherer carried by the lower end of the conveyer and discharging onto the latter, and means for raising and lowering the forward end of the conveyer, said gatherer being carried by the conveyer in its up and down movements.

23. In loading and containing machines for harvesting operations, a body portion having upstanding side walls, an elevating conveyer within the body portion between the side walls and having a transverse pivotal support at the lower end adjacent to the front of the body portion, and means for raising and lowering the front pivoted end of the conveyer.

24. In a machine of the class described, front and rear wheels, a body portion having upstanding side walls supported upon said wheels, an elevating conveyer substantially within the body portion between the side walls and having a transverse pivotal support at the lower end near the front of and below the bottom of the body portion, said conveyer standing at an inclination in rear of the front wheels, and means for raising and lowering the front pivoted end of the conveyer.

25. In a machine of the class described, a body portion having upstanding side walls, supporting wheels for said body, an elevating conveyer within the body portion between the side walls and pivoted upon a transverse axis, said axis in turn being swingable into adjusted positions about a second transverse fixed axis, the second axis lying underneath the body of the machine.

26. In a machine of the character described, a body portion having upstanding side walls, supporting wheels for said body, an elevating conveyer within the body portion between the side walls and pivoted upon a transverse axis, said axis in turn being swingable into adjusted positions about a second transverse fixed axis, the second axis lying underneath the machine, means located above the first-named axis for elevating and lowering the same with respect to the second axis, and means secured to the upper part of the conveyer for tilting the latter about the first axis.

27. In a machine of the character described, a body portion having upstanding side walls, supporting wheels for said body, an elevating conveyer within the body portion between the side walls and pivoted upon a transverse axis, said axis in turn being swingable into adjusted positions about a second transverse fixed axis, the second axis lying underneath the machine, means located above the first-named axis for lifting and lowering the same with respect to the conveyer for tilting the latter about the first axis, both of said transverse axes lying between the front and rear wheels but close to the front wheels.

28. In a machine of the character described, a body, an elevator mounted to deliver into the body, supporting wheels for the machine, a shaft, one of said wheels having driving connection with said shaft, said shaft being rockable about a transverse axis, a friction wheel on said shaft, a counter shaft mounted on the body and driven by said friction wheel when the first-named shaft is moved about its axis, and means connecting the counter shaft with the conveyer whereby these parts move simultaneously.

29. In a machine of the character described, a body portion or container having upstanding side walls and front and rear wheels, an elevating conveyer extending at its front end below the bottom of the body portion or container adjacent to the front wheels, said conveyer extending upwardly at an incline between the side walls toward the rear end of the body portion or container, but terminating short of said rear end, and means for pivoting said front end of the conveyer so as to permit the rear end to move up and down within the body portion or container, said conveyer discharging at its rear end into the latter.

30. In loading and containing machines for harvesting operations, a body portion including a container, an elevating conveyer within the body portion and delivering into the containing portion of the body, a gatherer carried by the lower forward end of the conveyer, means for raising and lowering the gatherer and front end of the conveyer, and means for tilting the conveyer to vary the inclination thereof.

31. In a machine of the class described, an elevating conveyer, supporting wheels, a container extending rearwardly of the rear wheels and having a downwardly hung rear gate, a sweep or pusher slidable within the container between the conveyer and the rear gate, means whereby the sweep or pusher may be moved toward the rear gate, and means for withdrawing the sweep or pusher to positions adjacent the conveyer.

32. In loading and containing machines for harvesting operations, a body portion including a container, an elevating conveyer within the body portion and delivering into the containing portion of the body, a gatherer at the lower forward end of the conveyer, means for raising and lowering the gatherer and front end of the conveyer, and means for tilting the conveyer to vary the inclination thereof, said machine being provided with traction means and connections therefrom to the conveyer and gatherer.

33. In loading and containing machines for harvesting operations, a body having upstanding side walls, supporting wheels for the body located within the confines of the side walls with the rear wheels rising into the body and said portion of the body receiving the rear wheels constituting a container, housings for the rear wheels located within the container, an elevating conveyer within the confines of the body and mounted to move about an axis transverse of the body near the front end of the latter, said conveyer being of a width to move between the housings into different positions of inclination, means for driving the moving elements of the conveyer, means for varying the tilt of the conveyer, means for raising and lowering the pivoted end of the conveyer, a gatherer for depositing material upon the lower end of the conveyer, and a sweep or pusher within the body movable between the housing below and to the rear of the conveyer.

34. In loading and containing machines for harvesting operations, a body having upstanding side walls, supporting wheels for the body located within the confines of the side walls with the rear wheels rising into the body and said portion of the body receiving the rear wheels constituting a container, housings for the rear wheels located within the container, an elevating conveyer within the confines of the body and mounted to move about an axis transverse of the body near the front end of the latter, said conveyer being of a width to move between the housings into different positions of inclination, means for driving the moving elements of the conveyer, means for varying the tilt of the conveyer, means for raising and lowering the pivoted end of the conveyer, a gatherer for depositing material upon the lower end of the conveyer, and a sweep or pusher within the body movable between the housings below and to the rear of the conveyer, the container portion of the body being provided with a rear pendant gate yieldable to the action of the pusher upon material accumulated in the container.

35. In loading and containing machines for harvesting operations, a body provided with a portion constituting a container, an elevating conveyer carried by and housed within the body portion and having movable conveying mechanism, and driving means for the conveying mechanism comprising a friction drum, another drum movable toward and from the friction drum and under the control of an operator, a traction wheel constituting one of the supporting wheels of the machine, and driving connections between the second named drum and the traction wheel.

36. In loading and containing machines for harvesting operations, a body provided with a portion constituting a container, an elevating conveyer for delivering material into the container and located within the body portion, and a sweep or pusher located within the container below the delivery end of the elevating conveyer, means whereby the sweep may be moved toward the rear end of the container to discharge accumulated material therefrom, and means under the control of an operator for retracting the sweep for engaging further material for discharge.

37. In loading and containing machines for harvesting operations, an elevating conveyer, and a gatherer for loading the conveyer comprising rotatable and rockable rakes with arms at the ends and cams engaging the arms, said cams having the engaging portions for the arms concentric with the axis of rotation of the rakes for a portion of the travel thereof and for the remainder of the travel having an extended path in part radial to said axis and in part curved, whereby the rakes are held in position to gather material and lift it to the lower end of the conveyer and then withdraw from the material in a substantially radial direction.

38. In loading and containing machines for harvesting operations, an elevating conveyer, and a gatherer for loading the conveyer comprising rotatable and rockable rakes with arms at the ends and cams engaging the arms, said cams having the engaging portions for the arms concentric with the axis of rotation of the rakes for a portion of the travel thereof and for the remainder of the travel having an extended path in part radial to said axis and in part curved, whereby the rakes are held in position to gather material and lift it to the lower end of the conveyer and then withdraw from the material in a substantially radial direction, said rakes being journaled at the ends in sprocket wheels, a shaft carrying the sprocket wheels and constituting propelling means therefor, and a chain and flights carried by the sprocket wheels and constituting the elevating elements of the conveyer.

39. In loading and containing machines for harvesting operations, a body with a container therein, an elevating conveyer mounted within the body portion to discharge into the container and comprising side bars, a drive shaft at the lower ends of and connecting the side bars, driving wheels on the drive shaft, an endless series of flights carried by the driving wheels, a gatherer at the lower end of the conveyer comprising rockable rakes journaled at the ends in the driving wheels, arms at the ends of the rakes, and cams carried by the side bars and engaged by and guiding the arms, each cam having a portion of semi-circular shape and of comparatively short radius and extending for about half the rotation of the arms and for the remainder of such rotation defining a semi-obovate contour of greater length than the semi-circular part.

40. In loading and containing machines for harvesting operations, a body with a container therein, an elevating conveyer mounted within the body portion to discharge into the container and comprising side bars, a drive shaft at the lower end of and connecting the side bars, driving wheels on the drive shaft, an endless series of flights carried by the driving wheels, a gatherer at the lower end of the conveyer comprising rockable rakes journaled at the ends in the driving wheels, each rake having bent teeth, arms at the ends of the rakes, cam structures carried by the side bars and engaged by and guiding the arms, each arm having a roller at its outer end and each cam being in the form of an endless groove receiving the rollers, the groove for a portion of its length being of substantially semi-circular shape concentric with the drive shaft and of relative short radius and of a length to include about one-half the rotative travel of the drive shaft and the remainder of the groove being of semi-obovate contour of greater length than the semi-circular part.

41. In loading and containing machines for harvesting operations, a body provided with a container, an elevating conveyer within the body and delivering into the container, said conveyer comprising side bars, a drive shaft at the lower ends of the side bars, driving wheels on the drive shaft, an endless series of flights propelled by the driving wheels, a gatherer at the lower end of the conveyer comprising rockable rakes journaled at the ends in the driving wheels, arms at the ends of the rakes, cam structures carried by the side bars and each engaged by and guiding the arms, each cam being in the form of a continuous groove with a portion of substantially semi-circular shape and of comparatively short radius extending about the drive shaft for substantially half the rotative travel thereof and for the remainder of its length being of semi-obovate conformation of greater length than the semi-circular part.

42. In a machine of the character described, a body portion having a part constituting a container, an elevating conveyer within the body portion and provided with flights having teeth or prongs mounted on the flights, each of said teeth or prongs having connection with individual springs to permit elastic yielding of the same in the direction of travel of the flights, and a stop to hold the same against movement in the opposite direction.

43. In loading and containing machines for harvesting operations, a body portion having a part constituting a container, an elevating conveyer located within the body portion for delivering into the container, rotatable drums mounted on the body portion and carrying strands connected to the elevating conveyer, and other drums, one connected to the first-named drums and the other mounted within reach of an operator, whereby the elevating conveyer may be raised or lowered at will.

44. In loading and containing machines for harvesting operations, a body member having a part constituting a container, and an elevating conveyer having an endless series of flights with a drive shaft at the lower end of the conveyer with driving wheels thereon, a pulley intermediate of the length of the shaft, gatherer rakes each comprising two sections in end to end relation at the pulley, sprocket wheels at the side portions of the conveyer, sprocket chains carrying the elevator flights and driven by the sprocket wheels, and a flexible belt constituting an intermediate support for the flights and passed about the pulley.

45. In a machine of the character described, a body having upstanding side walls, supporting wheels for the body located within the confines of the side walls with the rear wheels rising into the body, that portion of the body receiving the rear wheels constituting a container, housings for the rear wheels located within the container, an elevating conveyer within the confines of the body and mounted to move about an axis transverse to the body near the front end of the latter, said conveyer being of a width to move between the housings into different positions of inclination, and means for driving the moving elements of the conveyer.

46. In a machine of the character described, an elevating conveyer, a gatherer for loading the conveyer comprising rotatable and rockable rakes with arms at the ends and cams engaging the arms, said cams moving in paths concentric with the axis of rotation of the rakes for a portion of the travel thereof and for the remainder of the travel having an extended path in part radial to said axis and in part curved, whereby the rakes are held in position to gather material and lift it to the lower end of the conveyer and at once withdraw from the material in a substantially radial direction.

47. In a machine of the class described, an elevating conveyer, a gatherer for loading said conveyer, said conveyer having flights with straight teeth or prongs, the gatherer having unconfined teeth, each of the teeth comprising a material engaging portion extending radially with respect to the axis of rotation of the teeth, and a portion bent at an obtuse angle to the first-named portion.

48. In a machine of the class described, the combination of the body portion forming a container with upstanding side walls, and front and rear wheels arranged within the limits of said side walls, said body portion being composed of longitudinal sills and timbers, cross timbers, and a floor supported thereon, the framework of the body portion constituting the running gear of the vehicle.

49. In a machine of the class described, a load-carrying body or container having upstanding side walls with both ends open, an elevating conveyer pivotally mounted upon the machine and closing the front end of the body when the load has been taken on, and means at the rear end of the body for closing said end, said conveyer being movable upwardly and downwardly in the arc of a circle between the side walls of the body.

In testimony that I claim the foregoing as my own, I have hereto affixed my signature.

WILLIAM EDWARD WHITE.

Witnesses:
 EVA M. RANDALL,
 BRIAN BESSRY.